(12) United States Patent
Ahmed et al.

(10) Patent No.: US 12,113,696 B2
(45) Date of Patent: Oct. 8, 2024

(54) SYSTEM AND METHOD FOR MONITORING NETWORK PROCESSING OPTIMIZATION

(71) Applicant: BANK OF AMERICA CORPORATION, Charlotte, NC (US)

(72) Inventors: Syed Luqman Ahmed, New Delhi (IN); Adi Narayana Rao Garaga, Telangana (IN); Rakesh Jain, Haryana (IN); Sidhan Ramadevan Ponnanakkal, Hyderabad (IN); Abhay Kumar, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 159 days.

(21) Appl. No.: 17/590,368

(22) Filed: Feb. 1, 2022

(65) Prior Publication Data
US 2023/0246938 A1 Aug. 3, 2023

(51) Int. Cl.
G06F 11/00 (2006.01)
G06F 3/06 (2006.01)
H04L 41/0893 (2022.01)
H04L 41/149 (2022.01)
H04L 43/0817 (2022.01)
H04L 43/16 (2022.01)

(52) U.S. Cl.
CPC ............ H04L 43/16 (2013.01); G06F 3/0619 (2013.01); H04L 41/0893 (2013.01); H04L 41/149 (2022.05); H04L 43/0817 (2013.01)

(58) Field of Classification Search
CPC .. G06F 11/004; G06F 11/008; G06F 11/0754; G06F 11/0751; G06F 11/0793; H04L 41/14; H04L 41/147; H04L 41/149; H04L 43/0817; H04L 43/16
See application file for complete search history.

(56) References Cited

U.S. PATENT DOCUMENTS

| | | | |
|---|---|---|---|
| 6,986,076 B1 * | 1/2006 | Smith | G06F 11/004 714/4.11 |
| 7,669,087 B1 * | 2/2010 | Johnsen | G06F 11/008 714/6.32 |
| 8,370,697 B2 | 2/2013 | Veillette | |
| 8,468,311 B2 | 6/2013 | Gladwin et al. | |
| 8,532,149 B2 | 9/2013 | Van Greunen et al. | |

(Continued)

Primary Examiner — Marc Duncan
(74) Attorney, Agent, or Firm — Moore & Van Allen PLLC; Nicholas C. Russell

(57) ABSTRACT

Systems, methods, and computer program products are provided for monitoring network processing using node analysis. The method includes receiving node operation information relating to a node command from one or more nodes. The one or more nodes are grouped into a cluster. The method also includes determining one or more node characteristics based on the node operation information. The method further includes comparing the node characteristic(s) of the node command to expected node characteristic(s). The method still further includes determining a node outage likelihood. The node outage likelihood indicates the likelihood the given node will experience a node outage. The method also includes determining a cluster node operation plan. The cluster node operation plan is configured to determine the nodes of the cluster that must be in operation in an event of the node outage of the given node.

20 Claims, 7 Drawing Sheets

(56) References Cited

U.S. PATENT DOCUMENTS

| | | | |
|---|---|---|---|
| 8,769,132 B2 | 7/2014 | Sreenivasan et al. | |
| 8,792,409 B2 | 7/2014 | Borleske et al. | |
| 8,810,421 B2 | 8/2014 | Deaver, Sr. et al. | |
| 8,887,006 B2* | 11/2014 | Xia | G06F 11/2257 370/242 |
| 9,069,727 B2 | 6/2015 | Martin et al. | |
| 9,092,460 B2 | 7/2015 | Somogyi et al. | |
| 9,258,629 B2 | 2/2016 | Graves et al. | |
| 9,306,833 B2 | 4/2016 | Shaffer et al. | |
| 9,426,195 B2 | 8/2016 | Lear et al. | |
| 9,432,248 B2 | 8/2016 | Vasseur et al. | |
| 9,553,789 B2 | 1/2017 | Ganapathy et al. | |
| 9,614,726 B2 | 4/2017 | Farkas et al. | |
| 9,742,633 B2 | 8/2017 | Koziy et al. | |
| 9,904,605 B2 | 2/2018 | Bryant et al. | |
| 9,992,694 B2 | 6/2018 | Campbell | |
| 10,111,208 B2 | 10/2018 | Hindawi et al. | |
| 10,164,873 B1 | 12/2018 | Sood et al. | |
| 11,016,864 B2 | 5/2021 | Buzzard et al. | |
| 2008/0250265 A1* | 10/2008 | Chang | H04L 41/0663 714/4.12 |
| 2011/0107135 A1* | 5/2011 | Andrews | G06F 3/0607 714/E11.004 |
| 2017/0083822 A1* | 3/2017 | Adendorff | G06F 11/0793 |
| 2021/0241141 A1* | 8/2021 | Dugger | H04L 41/14 |
| 2021/0389991 A1* | 12/2021 | Chu | G06F 8/65 |
| 2023/0060461 A1* | 3/2023 | Kesavan | G06N 5/01 |

* cited by examiner

SYSTEM AND METHOD FOR MONITORING NETWORK PROCESSING OPTIMIZATION

TECHNOLOGICAL FIELD

An example embodiment relates generally to monitoring network processing, and more particularly, to monitoring network processing using node analysis.

BACKGROUND

System applications are expected to be up and running with little to no down time to maximize network operations. Outages can occur for various unavoidable circumstances. Network nodes are often complimentary to one another, meaning that the entire system can still operate while a given node is offline as long a related complimentary node remains online. There exists a need for a system that can monitor network processing in real-time to ensure network operation.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for monitoring network processing using node analysis. The system includes at least one non-transitory storage device and at least one processing device coupled to the at least one non-transitory storage device. The at least one processing device is configured to receive node operation information relating to a node command from one or more nodes. The one or more nodes are grouped into a cluster in which a required number of nodes must be online at a given time. The at least one processing device is also configured to determine one or more node characteristics based on the node operation information. The node characteristics relate to one or more operating indicators of the given node. The at least one processing device is further configured to compare the one or more node characteristics of the node command to one or more expected node characteristics. The expected node characteristics are based on the same or similar node commands previously executed. The at least one processing device is still further configured to determine a node outage likelihood based on the comparison of the one or more node characteristics of the node command to one or more expected node characteristics. The node outage likelihood indicates the likelihood the given node will experience a node outage within a predetermined amount of time. The at least one processing device is also configured to determine a cluster node operation plan. The cluster node operation plan is configured to determine the nodes of the cluster that must be in operation in an event of the node outage of the given node.

In some embodiments, the at least one processing device is further configured to determine the required number of nodes in the cluster that must be online at a given time. In such an embodiment, the required number of nodes in the cluster are the number of nodes in the cluster to maintain minimum cluster operation. In some embodiments, the at least one processing device is further configured to cause a transmission of an alert indicating that the cluster must be serviced based on the cluster node operation plan. In some embodiments, the at least one processing device is further configured to update a planned node outage for one or more nodes of the cluster in response to the node outage likelihood being above a predetermined threshold.

In some embodiments, the at least one processing device is further configured to generate an expected node outage event based on the node outage likelihood. In such an embodiment, the expected node outage event indicates the given node that is expected to experience a node outage and an expected time of the node outage. In some embodiments, the at least one processing device is further configured to determine an expected node outage solution. In such an embodiment, the expected node outage solution is based on one or more common node outage solutions for the given node. In some embodiments, the one or more node characteristics of the node command are monitored in real-time.

In another example embodiment, a computer program product for monitoring network processing using node analysis is provided. The computer program product includes at least one non-transitory computer-readable medium having computer-readable program code portions embodied therein. The computer-readable program code portions include an executable portion configured to receive node operation information relating to a node command from one or more nodes. The one or more nodes are grouped into a cluster in which a required number of nodes must be online at a given time. The computer-readable program code portions also include an executable portion configured to determine one or more node characteristics based on the node operation information. The node characteristics relate to one or more operating indicators of the given node. The computer-readable program code portions further include an executable portion configured to compare the one or more node characteristics of the node command to one or more expected node characteristics. The expected node characteristics are based on the same or similar node commands previously executed. The computer-readable program code portions still further include an executable portion configured to determine a node outage likelihood based on the comparison of the one or more node characteristics of the node command to one or more expected node characteristics. The node outage likelihood indicates the likelihood the given node will experience a node outage within a predetermined amount of time. The computer-readable program code portions also include an executable portion configured to determine a cluster node operation plan. The cluster node operation plan is configured to determine the nodes of the cluster that must be in operation in an event of the node outage of the given node.

In some embodiments, the computer-readable program code portions also include an executable portion configured to determine the required number of nodes in the cluster that must be online at a given time. In such an embodiment, the required number of nodes in the cluster are the number of nodes in the cluster to maintain minimum cluster operation. In some embodiments, the computer-readable program code portions also include an executable portion configured to cause a transmission of an alert indicating that the cluster must be serviced based on the cluster node operation plan. In some embodiments, the computer-readable program code portions also include an executable portion configured to update a planned node outage for one or more nodes of the cluster in response to the node outage likelihood being above a predetermined threshold.

In some embodiments, the computer-readable program code portions also include an executable portion configured to generate an expected node outage event based on the node outage likelihood. In such an embodiment, the expected node outage event indicates the given node that is expected to experience a node outage and an expected time of the node outage. In some embodiments, the computer-readable program code portions also include an executable portion configured to determine an expected node outage solution. In such an embodiment, the expected node outage solution is based on one or more common node outage solutions for the given node. In some embodiments, the one or more node characteristics of the node command are monitored in real-time.

In still another example embodiment, a computer-implemented method for monitoring network processing using node analysis is provided. The method includes receiving node operation information relating to a node command from one or more nodes. The one or more nodes are grouped into a cluster in which a required number of nodes must be online at a given time. The method also includes determining one or more node characteristics based on the node operation information. The node characteristics relate to one or more operating indicators of the given node. The method further includes comparing the one or more node characteristics of the node command to one or more expected node characteristics. The expected node characteristics are based on the same or similar node commands previously executed. The method still further includes determining a node outage likelihood based on the comparison of the one or more node characteristics of the node command to one or more expected node characteristics. The node outage likelihood indicates the likelihood the given node will experience a node outage within a predetermined amount of time. The method also includes determining a cluster node operation plan. The cluster node operation plan is configured to determine the nodes of the cluster that must be in operation in an event of the node outage of the given node.

In some embodiments, the method also includes determining the required number of nodes in the cluster that must be online at a given time. In such an embodiment, the required number of nodes in the cluster are the number of nodes in the cluster to maintain minimum cluster operation. In some embodiments, the method also includes causing a transmission of an alert indicating that the cluster must be serviced based on the cluster node operation plan. In some embodiments, the method also includes updating a planned node outage for one or more nodes of the cluster in response to the node outage likelihood being above a predetermined threshold.

In some embodiments, the method also includes generating an expected node outage event based on the node outage likelihood. In such an embodiment, the expected node outage event indicates the given node that is expected to experience a node outage and an expected time of the node outage. In some embodiments, the method also includes determining an expected node outage solution. In such an embodiment, the expected node outage solution is based on one or more common node outage solutions for the given node.

Embodiments of the present disclosure address the above needs and/or achieve other advantages by providing apparatuses (e.g., a system, computer program product and/or other devices) and methods for monitoring network processing optimization. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
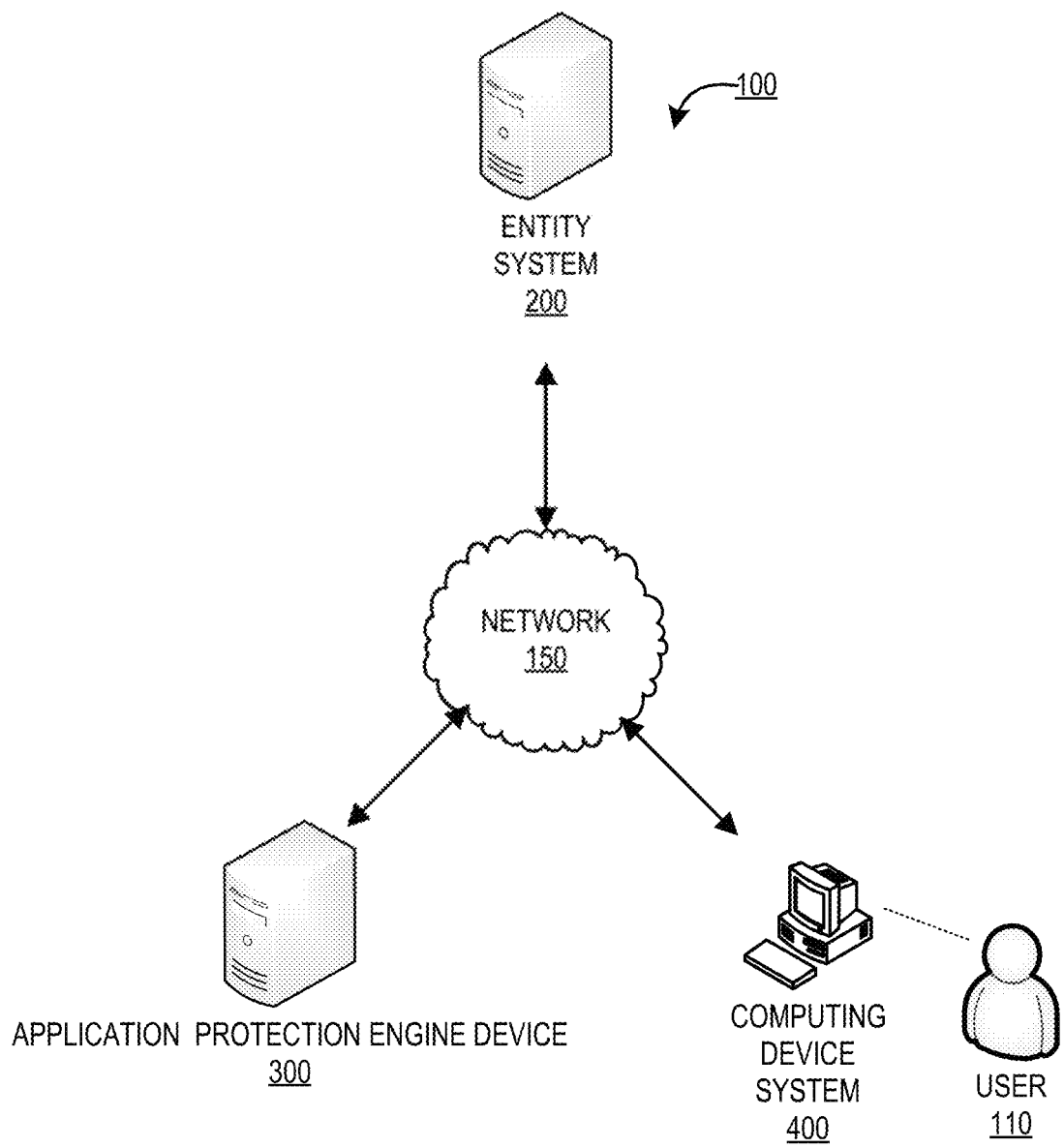
Figure 2:
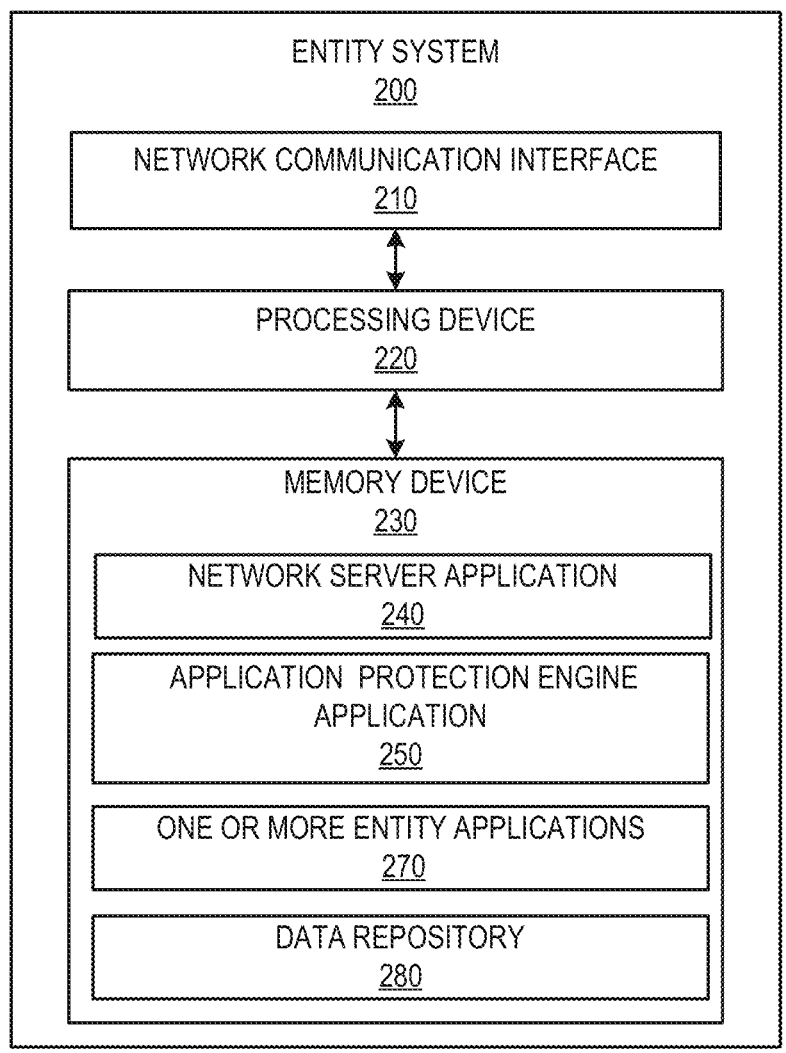
Figure 3:
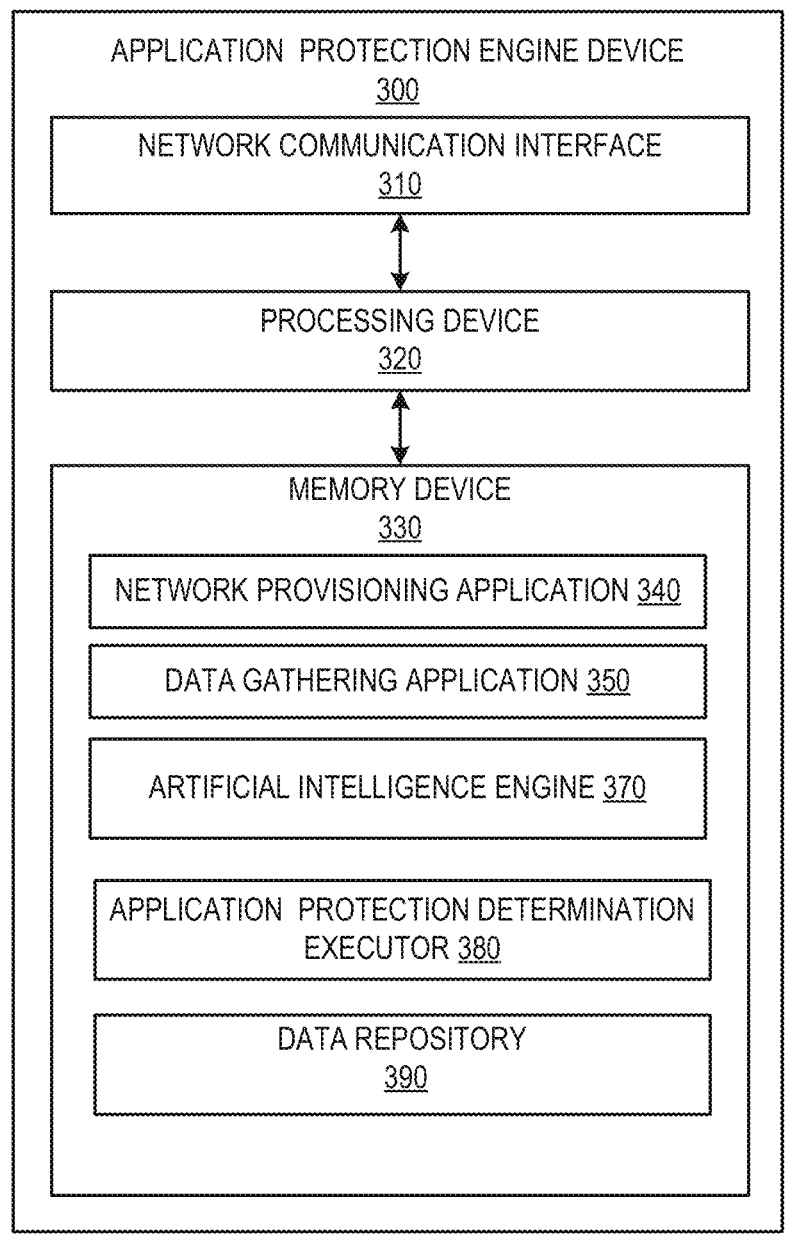
Figure 4:
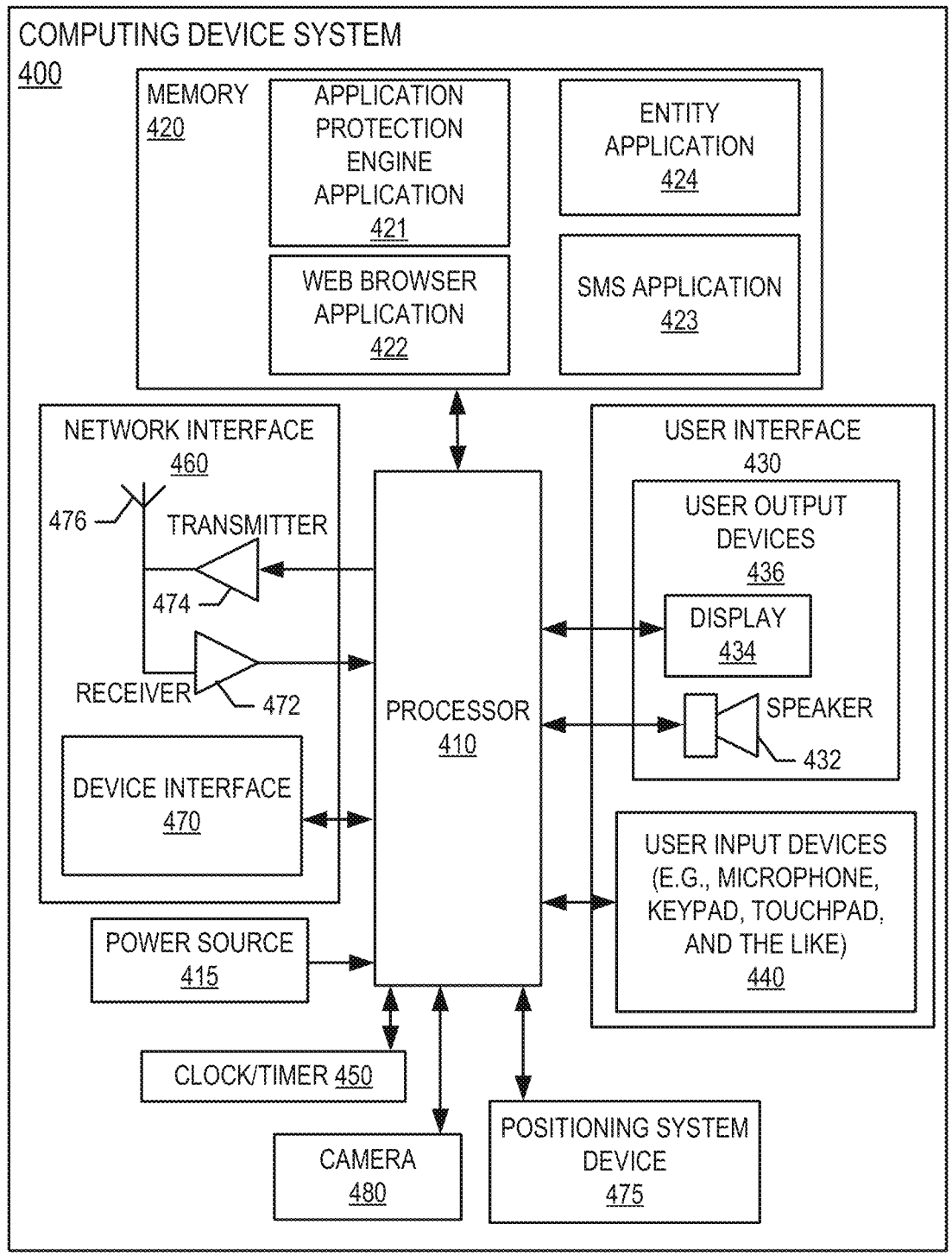
Figure 5:
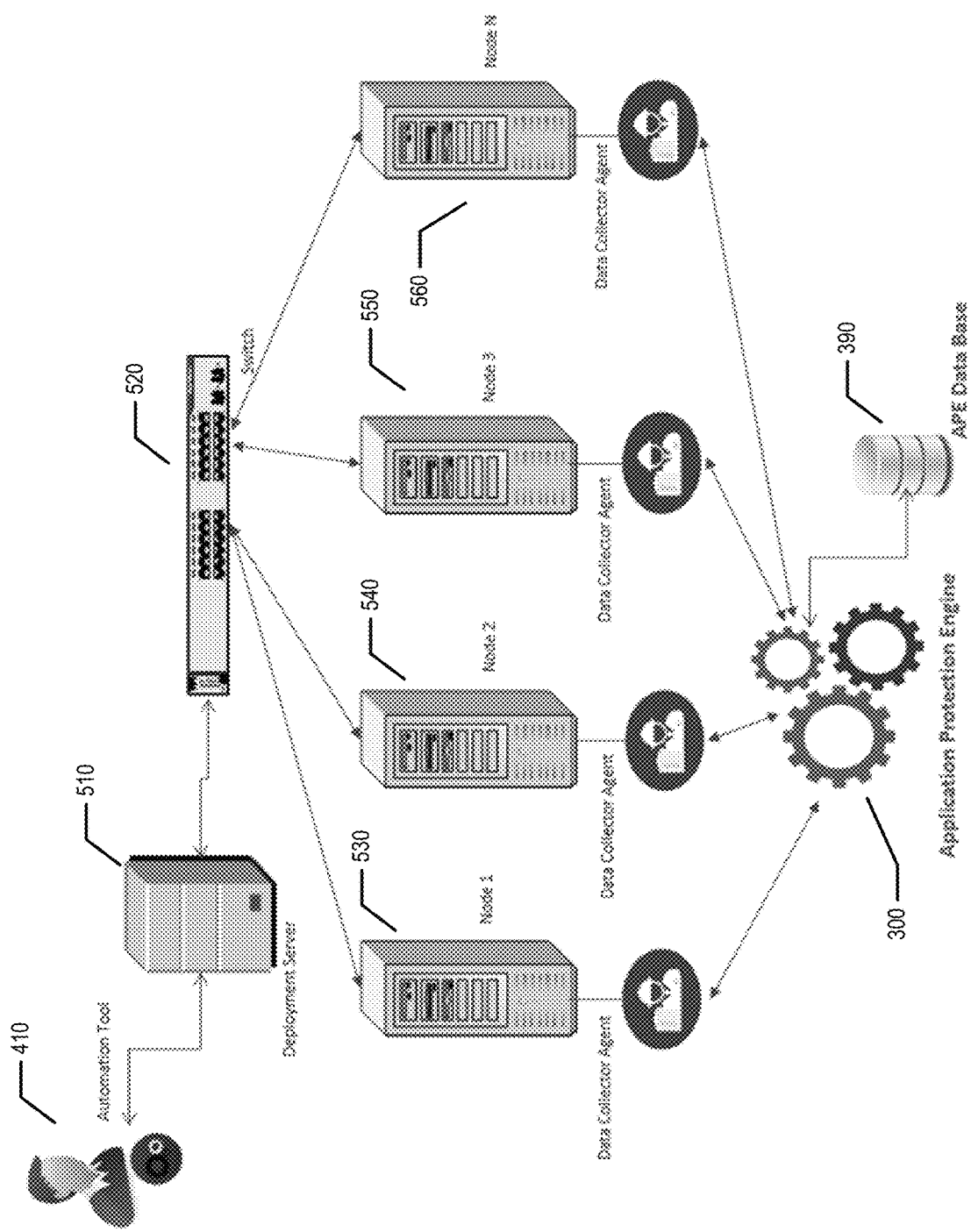
Figure 6:
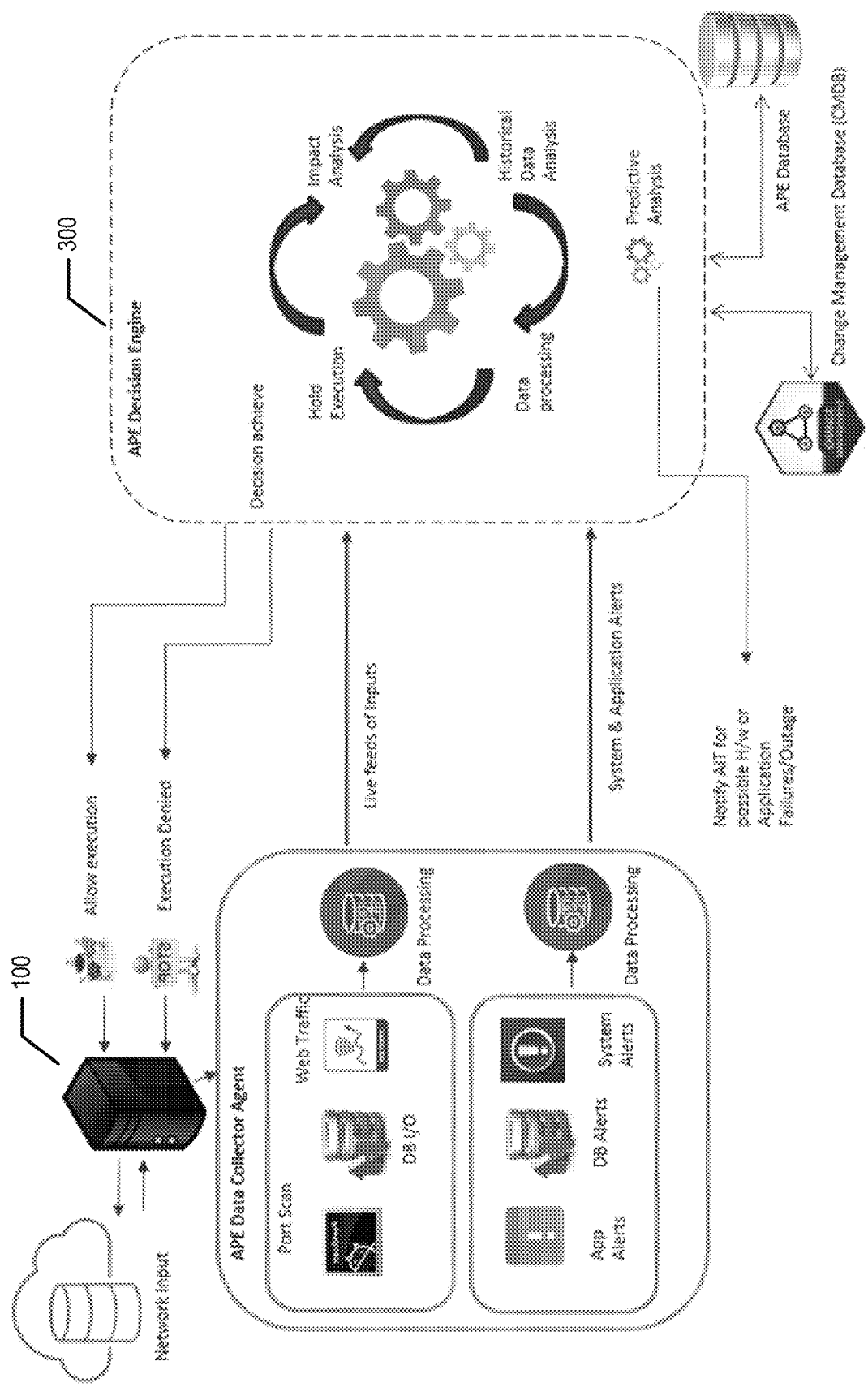
Figure 7:
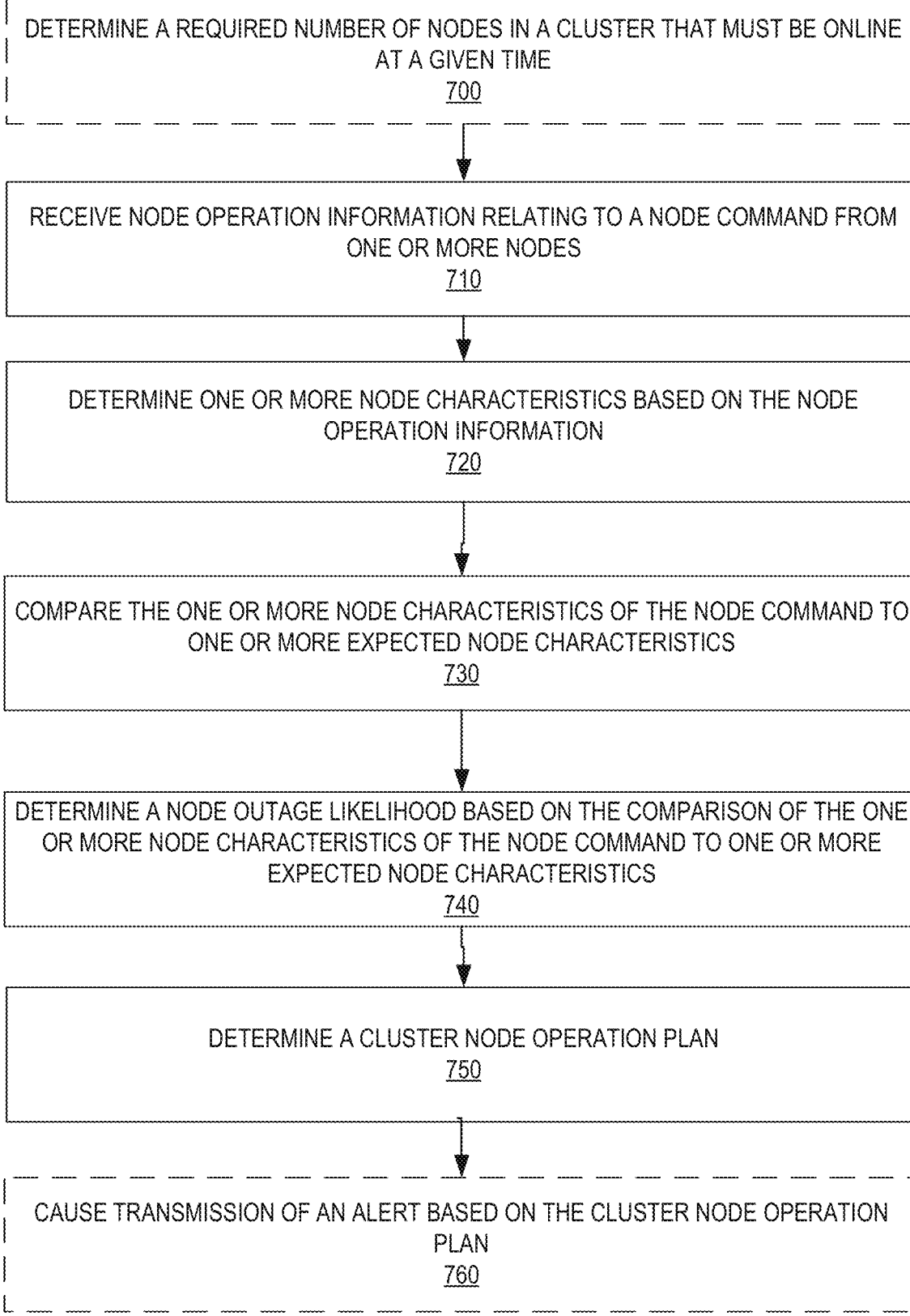

Having thus described embodiments of the disclosure in general terms, reference will now be made the accompanying drawings, wherein:

FIG. 1 provides a block diagram illustrating a system environment for monitoring network processing via real-time node analysis, in accordance with embodiments of the present disclosure;

FIG. 2 provides a block diagram illustrating the entity system 200 of FIG. 1, in accordance with embodiments of the present disclosure;

FIG. 3 provides a block diagram illustrating the application protection engine device 300 of FIG. 1, in accordance with embodiments of the present disclosure;

FIG. 4 provides a block diagram illustrating the computing device system 400 of FIG. 1, in accordance with embodiments of the present disclosure; and FIG. 5 provides a block diagram illustrating another embodiment of a system environment for monitoring network processing via real-time node analysis, in accordance with embodiments of the present disclosure;

FIG. 6 provides a flowchart of the operations of a system for monitoring network processing via real-time node analysis, in accordance with embodiments of the present disclosure; and FIG. 7 provides a flowchart illustrating a method of monitoring network processing using node analysis in accordance with embodiments of the present disclosure.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Mission critical applications are expected to be up and running with zero down time for systems to operate continuous. However, it is often impossible for every node of a system to be operational at all times. Nodes experience both planned and unplanned outages. Planned outages may include preventative maintenance (e.g., security patches, code fixes, code releases, or the like). Unplanned outages may include hardware failures at the node level. Currently no tool or mechanism prevents outages of services that cause the entire system to be taken offline.

Various embodiments of the present disclosure provide a system for monitoring network processing via real-time node analysis. The system uses an application protection engine that analyzes nodes in real-time to predict and prevent outages. Nodes of a system can often have complimentary nodes, meaning that one of the nodes can be offline without taking the entire system offline. Additionally, a node of a system may have a substitute node, that is only activated in an instance the given node is down.

The system of various embodiments monitors various operations of a node in real-time and compares said operations to historic data to determine that a failure is possible and/or imminent. Based on a determined potential outage, the system analyzes other nodes within a cluster with the failing node. A cluster is defined as one or more related nodes in which a specific number within the cluster are required to be online order for the system to remain online. For example, a cluster of five nodes may require at least three nodes to remain online at all times. The system determines if the failing node can be taken offline without taking the system offline and adjusts the system accordingly to ensure that taking a node offline would not also take the entire system offline.

To do this, the system (e.g., the application protection engine) will analyze node commands, such as server reboot, remote execution, defined application service, in real-time to determine potential outages. The system will analyze node operations, such as disk speed, network speed, power information, and/or other critical alerts. Based on the analysis, the system can determine a potential future outage of a node and can either notify a user or update the operations automatically to plan for such an outage. The system can also determine the potential solution to the potential failure. For example, the disc speed may be slower than previously, and the system may predict that a new disk drive is needed. The system ensure minimum infrastructure is running as much as possible, ensuring little to no system downtime. The system may also use critical database alerts, server OS alerts, hardware alerts, and/or the like to predict potential outages.

FIG. 1 provides a block diagram illustrating a system environment 100 for monitoring network processing via real-time node analysis. As illustrated in FIG. 1, the environment 100 includes an application protection engine device 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The application protection engine device 300 is a system of the present disclosure for performing one or more process steps described herein. In some embodiments, the application protection engine device 300 may be an independent system. In some embodiments, the application protection engine device 300 may be a part of the entity system 200. For example, the method of FIG. 7 may be carried out by the entity system 200, the application protection engine device 300, the computing device system 400, and/or a combination thereof.

The application protection engine device 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the application protection engine device 300 is configured to communicate information or instructions with the entity system 200, and/or the computing device system 400 across the network 150. While the entity system 200, the application protection engine device 300, and the computing device system 400 are illustrated as separate components communicating via network 150, one or more of the components discussed here may be carried out via the same system (e.g., a single system may include the entity system 200 and the application protection engine device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the application protection engine device 300, and/or entity system 200 across the network 150.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an application protection engine application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the application protection engine application 250, the one or more entity application 270 to perform certain logic, data-extraction, and data-storing functions of the entity system 200 described herein, as well as communication functions of the entity system 200.

The network server application 240, the application protection engine application 250, and the one or more entity applications 270 are configured to store data in the data repository 280 or to use the data stored in the data repository 280 when communicating through the network communication interface 210 with the application protection engine device 300, and/or the computing device system 400 to perform one or more process steps described herein. In some embodiments, the entity system 200 may receive instructions from the application protection engine device 300 via the application protection engine application 250 to perform certain operations. The application protection engine application 250 may be provided by the application protection engine device 300. The one or more entity applications 270 may be any of the applications used, created, modified, facilitated, and/or managed by the entity system 200.

FIG. 3 provides a block diagram illustrating the application protection engine device 300 in greater detail, in accordance with various embodiments. As illustrated in FIG. 3, in one embodiment, the application protection engine device 300 includes one or more processing devices 320 operatively coupled to a network communication interface 310 and a memory device 330. In certain embodiments, the application protection engine device 300 is operated by an entity, such as a financial institution. In some embodiments, the application protection engine device 300 is owned or operated by the entity of the entity system 200. In some embodiments, the application protection engine device 300 may be an independent system. In alternate embodiments, the application protection engine device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the application protection engine device 300 described herein. For example, in one embodiment of the application protection engine device 300, the memory device 330 includes, but is not limited to, a network provisioning application 340, a data gathering application 350, an artificial intelligence engine 370, an application protection determination executor 380, and a data repository 390 comprising any data processed or accessed by one or more applications in the memory device 330. The computer-executable program code of the network provisioning application 340, the data gathering application 350, the artificial intelligence engine 370, and the application protection determination executor 380 may instruct the processing device 320 to perform certain logic, data-processing, and data-storing functions of the application protection engine device 300 described herein, as well as communication functions of the application protection engine device 300.

The artificial intelligence engine 370 and/or the application protection determination executor 380 may alone, or in combination, be configured to determine the node outage likelihood discussed in reference to FIG. 7 below. The artificial intelligence engine 370 and/or the application protection determination executor 380 may include a change management database and/or an APE database (shown in FIG. 6) generated to assist in determining the node outage likelihood. The change management database and the APE database may be separate or combined (e.g., within data repository 390 or elsewhere within the memory device 330).

The network provisioning application 340, the data gathering application 350, the artificial intelligence engine 370, and the application protection determination executor 380 are configured to invoke or use the data in the data repository 390 when communicating through the network communication interface 310 with the entity system 200, and/or the computing device system 400. In some embodiments, the network provisioning application 340, the data gathering application 350, the artificial intelligence engine 370, and the application protection determination executor 380 may store the data extracted or received from the entity system 200, and the computing device system 400 in the data repository 390. In some embodiments, the network provisioning application 340, the data gathering application 350, the artificial intelligence engine 370, and the application protection determination executor 380 may be a part of a single application.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned. The computing device system 400 may be a device in which the nodes discussed herein are in communication and applications carried out on said nodes may be carried out on said computing device system 400.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include one or more displays 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an application protection engine application 421, entity application 424. These applications also typically instructions to a graphical user interface (GUI) on the display 430 that allows the user 110 to interact with the entity system 200, the application protection engine device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the application protection engine application 421 provided by the application protection engine device 300 allows the user 110 to access the application protection engine device 300. In some embodiments, the entity application 424 provided by the entity system 200 and the application protection engine application 421 allow the user 110 to access the functionalities provided by the application protection engine device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Referring now to FIG. 5, a block diagram illustrating an example embodiment of a system for monitoring networking processing via real-time node analysis is provided. As shown, a system may include multiple nodes, such as node 1 530, node 2 540, node 3 550, and additional nodes n 560. Each node is connected to a data collector agent, which receives node operation information, the node operation information includes node commands that have been or plan to be carried out by the node and information relating to node performance in completing said node command. Node commands may include server boots or reboots, remote execution, and/or defined application operations. The system may be configured to not implement any node commands until the application protection engine 300 has analyzed and approved a node command. Upon receiving one or more node commands from one or more node, the data collector agents may cause the transmission of the node operation information to the application protection engine 300.

The application protection engine 300 analyzes the node operation information compared to historical data from the same or similar node. The historical data may be stored in the APE database (e.g., data repository 390 shown in FIG. 3). Based on the comparison of the node operation information to the historical data from the same or similar node, the application protection engine 300 determines the likelihood of a potential outage. The determination of a potential outage is based on system information that is different than past operations. For example, the system may monitor a system reboot compared to a previous system reboots to determine if any system indicators have changed. Upon determining a potential outage, the system is configured to determine if enough nodes in a cluster are going to be active to allow for the potential outage without interruption of system operation.

As an example, Node 1 530, Node 2 540, and Node 3 550 may all be in a cluster, such that at least two of the nodes must be online in order for the system to be operational. Therefore, the system (e.g., the application protection engine 300) may analyze potential outages, as well as planned outages to ensure that at least two of the nodes are online at all times. In this example, in an instance in which Node 1 has a potential outage, Node 2 and Node 3 must continue to operate. Therefore, the application protection engine 300 may confirm that Node 2 and Node 3 are not to be taken offline until the potential outage is fixed. Confirming that some nodes remain online may include analyzing planned outages for given nodes. The system can be configured to either automatically update planned outage schedules or send a notification that a planned maintenance should be delayed. Additionally, information relating to the potential outage may also be transmitted as a notification. As such, the application protection engine must approve a node command before it is deployed via the switch 520 and ultimately the deployment server 510 to the user 110.

FIG. 6 illustrates the system 100 of an example embodiment in more detail. As shown, the network input relates to a node command and is received by the system. Upon receiving the network input (e.g., node command), the data collector agent may record said node command along with node operation information and transmit said data to the APE 300. In some instances, the APE and the data collector agent may be housed within the same device (e.g., entity system 200). The APE 300 receives node operation information that includes real-time feeds of inputs and system and application alerts. Based on the information, the APE 300 determines whether to approve the node command. As discussed above in reference to FIG. 5, the APE may compare the node information to an expected node information that is based on previous operations of the same or similar node. Additional operations discussed in FIGS. 5 and 7 may also be carried out by the APE 300.

Referring now to FIG. 7, a method of monitoring network processing using node analysis is provided. The method may be carried out by a system discussed herein (e.g., the entity system 200, the application protection engine device 300, and/or the computing device system 400). An example system may include at least one non-transitory storage device and at least one processing device coupled to the at least one non-transitory storage device. In such an embodiment, the at least one processing device is configured to carry out the method discussed herein.

The term "node" refers to an individual server within a system. The node is configured to perform one or more operations. A system may have multiple nodes that work in tandem to perform at least a minimum operation of a system. As such, not every node must be only at a given time, to allow for node maintenance or other node downtime without affecting system operability. The system and methods discussed here are used to ensure that enough nodes are operational at a given time to avoid any downtime.

Referring now to optional Block 700 of FIG. 7, the method may include determining a required number of nodes in a cluster that must be online at a given time. A cluster of nodes may be one or more of the total nodes in a system. A system may have one or more clusters of nodes within the nodes in the system. The cluster of nodes may be grouped together based on similar operations. The determination of the nodes within a given cluster may be determined automatically (e.g., the system may be configured to determine cluster assignments based on the operation of a given node) and/or manually (e.g., a user can assign one or more nodes to a given cluster). Within each cluster, a required number of nodes may be needed to maintain minimum cluster operation. The required number of nodes may be different based on the given cluster. The system may be configured to determine required number of nodes within the cluster that must be operational for the cluster to stay operating. Additionally or alternatively, the system may receive information on the required number of nodes in the cluster (e.g., a technician may input the required number of nodes that need to be operational at a given time).

Referring now to Block 710 of FIG. 7, the method may include receiving node operation information relating to a node command from one or more nodes. Node operation information may be tracked for each node command relating to one or more nodes. A node command is any function to be carried out using the node. The node command may be a set of instructions received from a node, such as a server reboot, remote execution, defined application services, or the like. The system is configured to determine if the node command is to be carried out successfully. The node operation information provided with the node command includes node characteristics that can be used to determine whether a node is functioning correctly. The node operation information may include one or more inputs of the node including, for example, component functionality, execution statistics, and/or the like. Node operation information may also include network and/or system traffic data that allows for the system to determine necessary nodes to carry out a given node command. For example, a given node command may use multiple nodes within a cluster during execution.

Referring now to Block 720 of FIG. 7, the method may include determining one or more node characteristics based on the node operation information. The node characteristic(s) may include node health indicators. The node health indicators may vary based on the type of node. Each node may have one or more node health indicators that are tracked to determine whether the node is operating correctly. Such monitoring may be carried out in real-time or near real-time, allowing the node health to be monitored continuously to avoid system downtime. Node characteristics may be stored by the system (e.g., on data repository 390) and used for comparisons discussed in reference to Block 730 below.

Referring now to Block 730 of FIG. 7, the method may include comparing the one or more node characteristics of the node command to one or more expected node characteristics. The expected node characteristic(s) may be based on historical node characteristics. The historical node characteristics can be from the same node or a similar node. The historical node characteristic(s) may also be based on the same type of node command. For example, the node characteristics may be stored for previous node commands and then compared to a given node characteristic to determine if there are any differences that would indicate a failing node.

Referring now to Block 740 of FIG. 7, the method may include determining a node outage likelihood based on the comparison of the one or more node characteristics of the node command to one or more expected node characteristics. The node outage likelihood indicates the likelihood the given node will experience a node outage within a predetermined amount of time. The node outage likelihood may be based on the comparison of the node characteristic(s) to the expected node characteristics. The more difference between the node characteristic(s) and the expected node characteristic(s), the higher the node outage likelihood may be for the given node. For example, in an instance in which the node characteristic is disk speed and the disk speed is substantially lower than the expected disk speed (e.g., a previous disk speed), the node outage likelihood may be higher than an instance in which the disk speed is more similar to the expected disk speed.

The node outage likelihood may have an outage threshold that indicates an expected node outage event. In an instance, the node outage likelihood meets a predetermined outage threshold, the method may include generating an expected node outage event. The expected node outage event indicates the given node that is expected to experience a node outage. The expected node outage event may also include determining an expected time of the node outage (e.g., an estimate on the time that the node will be inoperable). In some embodiments, the node outage likelihood may indicate that a given node is already offline.

Referring now to Block 750 of FIG. 7, the method may include determining a cluster node operation plan. Based on the node outage likelihood, the system is configured to determine which nodes within the given cluster are to be operable at a given time. The system may also have information relating to planned node outages. As such, the system can determine one or more nodes that will be inoperable (e.g., either unplanned or planned) at a given time. The cluster node operation plan may include the nodes that need to be operating at a given time to maintain the system functionality based on determining that a node is expected to be offline.

The cluster node operation plan may include automated steps to avoid the cluster being inoperable. For example, the cluster node operation plan may include automatically adjusting planned node outages to accommodate potential unplanned outages. The cluster node operation plan may include updating one or more planned node outages to one or more nodes in the given cluster in response to the node outage likelihood of a node in the cluster being below a predetermined threshold.

Additionally or alternatively, the cluster node operation plan may include the system causing a transmission of a notification indicating an expected node outage event for a technician to investigate. For example, the system may notify a technician that a given node is likely to fail and needs to be replaced or repaired to avoid system inoperability.

The method may also include determining an expected node outage solution for the expected node outage event. The system may be configured to determine one or more common node issues that cause the expected node outage event detected. The expected node outage solution(s) may be transmitted along with the notification or alert discussed herein. Additionally, in some instance, the expected node outage solution may be automatically implemented. For example, in an instance the expected node outage solution is related to software, the system may automatically update the node software to remedy the issue.

The system may use machine learning algorithms and/or machine learning models to determine the cluster node operation plan. For example, the system may use machine learning to determine the expected node characteristic(s) based on historical node characteristics. In various embodiments, the system may process the node characteristics into a machine learning database (e.g., APE database) and use said machine learning database to determine future expected node characteristic.

Referring now to optional Block 760 of FIG. 7, the method may include causing a transmission of an alert indicating that the cluster must be serviced based on the cluster node operation plan. The alert may be transmitted to a technician that is capable of fixing the given issue. For example, the node may be a server in a server bank and the alert may be transmitted to a technician at the server bank to investigate the given node. In some instances, the alert may include the expected node outage solution, such as replacing the node or performing other repairs to the node. The alert may also include information relating to the node outage likelihood, such as a threat level indicator that indicates the urgency of the node issue.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for monitoring network processing using node analysis in a communication network, in real time, wherein the system is structured for precluding outages of network components from causing the system to be taken offline, based on structuring network nodes into clusters and analyzing node commands and node operations, the system comprising:
   a plurality of network nodes, wherein each of the plurality of network nodes is associated with an individual server of the communication network;
   at least one data collector agent component, wherein each of the plurality of network nodes is connected to the data collector agent component, wherein the data collector agent component is structured to receive node operation information from the plurality of network nodes;
   an application protection engine component operatively connected to the data collector agent component, wherein the application protection engine component is structured to receive (i) live input feeds and (ii) application alerts from the data collector agent component, and analyze and approve node commands associated with the plurality of network nodes;
   an application protection engine data repository;
   at least one non-transitory storage device; and
   at least one processing device coupled to the at least one non-transitory storage device, wherein the at least one processing device is configured to:
      receive, via the at least one data collector agent component, the node operation information relating to a node command from one or more nodes of the plurality of network nodes, wherein the one or more nodes are grouped into a cluster in which a required number of nodes must be online at a given time, wherein the node command comprises server boot, server reboot, remote execution, and defined application operations;
      deny execution of the node command until approval of the node command by the application protection engine component;
      transmit, via the at least one data collector agent component, the node command to the application protection engine component;
      based on the node operation information, determine one or more node characteristics, wherein the node characteristics relate to one or more operating indicators and health indicators of a given node, wherein the health indicators of the given node are continuously monitored;
      compare the one or more node characteristics of the node command to one or more expected node characteristics, wherein the expected node characteristics are extracted from the application protection engine data repository and are based on same or similar node commands previously executed, comprising determining a failing node in response to determining a deviation from the previously executed node commands;
      based on comparing the one or more node characteristics of the node command to one or more expected node characteristics, determine a node outage likelihood, wherein the node outage likelihood indicates likelihood the given node will experience a node outage within a predetermined amount of time and a duration of the node outage for which the given node will be inoperable;
      determine a cluster node operation plan, wherein the cluster node operation plan is configured to determine the nodes of the cluster that must be in operation in an event of the node outage of the given node, wherein determining the cluster node operation plan further comprises:
         detecting planned node outages associated with the one or mode nodes; and
         modifying, in response to the node outage likelihood, the planned node outages associated with the one or mode nodes, such that the inoperability of the cluster is precluded;
      transmit a notification of the node outage likelihood indicating a replace or repair requirement for the given node; and
      implement an expected node outage solution for the event of the node outage of the given node.

2. The system of claim 1, wherein the at least one processing device is further configured to:

determine, based on node operation information, necessary nodes of the plurality of network nodes for executing the node command, wherein node operation information comprises network traffic data;
construct the cluster comprising the one or more nodes of the plurality of network nodes based on operations of the one or more nodes; and
determine the required number of nodes in the cluster that must be online at a given time to maintain minimum cluster operation, wherein the required number of nodes in the cluster are the number of nodes in the cluster to maintain minimum cluster operation.

3. The system of claim 1, wherein the at least one processing device is further configured to cause a transmission of an alert indicating that the cluster must be serviced based on the cluster node operation plan comprising repairing or replacing a node of the cluster.

4. The system of claim 1, wherein the at least one processing device is further configured to update a planned node outage for one or more nodes of the cluster in response to the node outage likelihood being above a predetermined threshold.

5. The system of claim 1, wherein the one or more node characteristics comprise disk speed, wherein the node outage likelihood is determined based on identifying that the disk speed is substantially lower than an expected disk speed, wherein the at least one processing device is further configured to generate an expected node outage event based on the node outage likelihood, wherein the expected node outage event indicates the given node that is expected to experience a node outage and an expected time of the node outage.

6. The system of claim 1, wherein the at least one processing device is further configured to determine the expected node outage solution, wherein the expected node outage solution is based on one or more common node outage solutions for the given node, wherein implementing the expected node outage solution comprises automatically updating node software.

7. The system of claim 1, wherein the one or more node characteristics of the node command are monitored in real-time, wherein the node operation information comprises inputs to the node, component functionality data, execution statistics, and network traffic data.

8. A computer program product for monitoring network processing using node analysis in a communication network, in real time, wherein the computer program product is structured for precluding outages of network components from causing a system to be taken offline, based on structuring network nodes into clusters and analyzing node commands and node operations, the computer program product comprising at least one non-transitory computer-readable medium having computer-readable program code portions embodied therein, the computer-readable program code portions comprising executable portions configured to:
receive, via at least one data collector agent component, the node operation information relating to a node command from one or more nodes of a plurality of network nodes, wherein the one or more nodes are grouped into a cluster in which a required number of nodes must be online at a given time, wherein each of the plurality of network nodes is associated with an individual server of the communication network and is connected to the data collector agent component, wherein the node command comprises server boot, server reboot, remote execution, and defined application operations;
deny execution of the node command until approval of the node command by an application protection engine component operatively connected to the data collector agent component, wherein the application protection engine component is structured to receive (i) live input feeds and (ii) application alerts from the data collector agent component, and analyze and approve node commands associated with the plurality of network nodes;
transmit, via the at least one data collector agent component, the node command to the application protection engine component;
based on the node operation information, determine one or more node characteristics, wherein the node characteristics relate to one or more operating indicators and health indicators of the given node, wherein the health indicators of the given node are continuously monitored;
compare the one or more node characteristics of the node command to one or more expected node characteristics, wherein the expected node characteristics are extracted from an application protection engine data repository and are based on the same or similar node commands previously executed, comprising determining a failing node in response to determining a deviation from the previously executed node commands;
determine a node outage likelihood based on comparing the one or more node characteristics of the node command to one or more expected node characteristics, wherein the node outage likelihood indicates likelihood the given node will experience a node outage within a predetermined amount of time and a duration of the node outage for which the given node will be inoperable;
determine a cluster node operation plan, wherein the cluster node operation plan is configured to determine the nodes of the cluster that must be in operation in an event of the node outage of the given node, wherein determining the cluster node operation plan further comprises:
detecting planned node outages associated with the one or mode nodes; and
modifying, in response to the node outage likelihood, the planned node outages associated with the one or mode nodes, such that the inoperability of the cluster is precluded;
transmit a notification of the node outage likelihood indicating a replace or repair requirement for the given node; and
implement an expected node outage solution for the event of the node outage of the given node.

9. The computer program product of claim 8, wherein the computer-readable program code portions also comprise an executable portion configured to:
determine, based on node operation information, necessary nodes of the plurality of network nodes for executing the node command, wherein node operation information comprises network traffic data;
construct the cluster comprising the one or more nodes of the plurality of network nodes based on operations of the one or more nodes; and
determine the required number of nodes in the cluster that must be online at a given time to maintain minimum cluster operation, wherein the required number of nodes in the cluster are the number of nodes in the cluster to maintain minimum cluster operation.

10. The computer program product of claim 8, wherein the computer-readable program code portions also comprise an executable portion configured to cause a transmission of an alert indicating that the cluster must be serviced based on the cluster node operation plan comprising repairing or replacing a node of the cluster.

11. The computer program product of claim 8, wherein the computer-readable program code portions also comprise an executable portion configured to update a planned node outage for one or more nodes of the cluster in response to the node outage likelihood being above a predetermined threshold.

12. The computer program product of claim 8, wherein the one or more node characteristics comprise disk speed, wherein the node outage likelihood is determined based on identifying that the disk speed is substantially lower than an expected disk speed, wherein the computer-readable program code portions also comprise an executable portion configured to generate an expected node outage event based on the node outage likelihood, wherein the expected node outage event indicates the given node that is expected to experience a node outage and an expected time of the node outage.

13. The computer program product of claim 8, wherein the computer-readable program code portions also comprise an executable portion configured to determine the expected node outage solution, wherein the expected node outage solution is based on one or more common node outage solutions for the given node, wherein implementing the expected node outage solution comprises automatically updating node software.

14. The computer program product of claim 8, wherein the one or more node characteristics of the node command are monitored in real-time, wherein the node operation information comprises inputs to the node, component functionality data, execution statistics, and network traffic data.

15. A computer-implemented method for monitoring network processing using node analysis in a communication network, in real time, wherein the method is structured for precluding outages of network components from causing a system to be taken offline, based on structuring network nodes into clusters and analyzing node commands and node operations, the method comprising:
receiving, via at least one data collector agent component, the node operation information relating to a node command from one or more nodes of a plurality of network nodes, wherein the one or more nodes are grouped into a cluster in which a required number of nodes must be online at a given time, wherein each of the plurality of network nodes is associated with an individual server of the communication network and is connected to the data collector agent component, wherein the node command comprises server boot, server reboot, remote execution, and defined application operations;
denying execution of the node command until approval of the node command by an application protection engine component operatively connected to the data collector agent component, wherein the application protection engine component is structured to receive (i) live input feeds and (ii) application alerts from the data collector agent component, and analyze and approve node commands associated with the plurality of network nodes;
transmitting, via the at least one data collector agent component, the node command to the application protection engine component;
based on the node operation information, determining one or more node characteristics, wherein the node characteristics relate to one or more operating indicators and health indicators of the given node, wherein the health indicators of the given node are continuously monitored;
comparing the one or more node characteristics of the node command to one or more expected node characteristics, wherein the expected node characteristics are extracted from an application protection engine data repository and are based on the same or similar node commands previously executed, comprising determining a failing node in response to determining a deviation from the previously executed node commands;
based on the comparison of the one or more node characteristics of the node command to one or more expected node characteristics, determining a node outage likelihood, wherein the node outage likelihood indicates likelihood the given node will experience a node outage within a predetermined amount of time and a duration of the node outage for which the given node will be inoperable;
determining a cluster node operation plan, wherein the cluster node operation plan is configured to determine the nodes of the cluster that must be in operation in an event of the node outage of the given node, wherein determining the cluster node operation plan further comprises:
detecting planned node outages associated with the one or mode nodes; and
modifying, in response to the node outage likelihood, the planned node outages associated with the one or mode nodes, such that the inoperability of the cluster is precluded;
transmitting a notification of the node outage likelihood indicating a replace or repair requirement for the given node; and
implementing an expected node outage solution for the event of the node outage of the given node.

16. The method of claim 15, further comprising:
determining, based on node operation information, necessary nodes of the plurality of network nodes for executing the node command, wherein node operation information comprises network traffic data;
constructing the cluster comprising the one or more nodes of the plurality of network nodes based on operations of the one or more nodes; and
determining the required number of nodes in the cluster that must be online at a given time to maintain minimum cluster operation, wherein the required number of nodes in the cluster are the number of nodes in the cluster to maintain minimum cluster operation.

17. The method of claim 15, further comprising causing a transmission of an alert indicating that the cluster must be serviced based on the cluster node operation plan comprising repairing or replacing a node of the cluster.

18. The method of claim 15, further comprising updating a planned node outage for one or more nodes of the cluster in response to the node outage likelihood being above a predetermined threshold.

19. The method of claim 15, wherein the one or more node characteristics comprise disk speed, wherein the node outage likelihood is determined based on identifying that the disk speed is substantially lower than an expected disk speed, further comprising generating an expected node outage event based on the node outage likelihood, wherein the expected node outage event indicates the given node that is expected to experience a node outage and an expected time of the node outage.

20. The method of claim 15, further comprising determining the expected node outage solution, wherein the expected node outage solution is based on one or more common node outage solutions for the given node, wherein implementing the expected node outage solution comprises automatically updating node software.

* * * * *